United States Patent [19]

Komori

[11] 4,133,545
[45] Jan. 9, 1979

[54] HOLDER FOR AN ELONGATE TOOL SHANK

[75] Inventor: Hideo Komori, Futtsu, Japan

[73] Assignee: Kuroda Seiko Co., Ltd., Kanagawa, Japan

[21] Appl. No.: 811,042

[22] Filed: Jun. 29, 1977

[30] Foreign Application Priority Data

Jul. 5, 1976 [JP] Japan ............... 51-88114[U]

[51] Int. Cl.² ............................................. B23B 31/04
[52] U.S. Cl. ................................. 279/83; 279/1 TS
[58] Field of Search ........... 279/83, 1 R, 1 ME, 1 TS, 279/9 R, 76; 408/233; 90/11 A

[56] References Cited

U.S. PATENT DOCUMENTS 3,557,419  1/1971  Flannery ........................ 279/83 X Primary Examiner—Gil Weidenfeld
Attorney, Agent, or Firm—Holman & Stern

[57] ABSTRACT

A holder for tightly gripping the shank of an elongate cutting or like tool comprises a shank portion and a base portion with a cylindrical outer surface. The holder has a central bore for receiving the tool shank and transverse screws intersecting the bore for tightening against the tool shank. A ring encircles the cylindrical portion of the base member and under stresses caused by tightening the screws against the tool shank, the ring and base portion deform between conditions in which the ring is rotatable on the base portion and non-rotatable on the base portion. The rotatable or non-rotatable condition of the ring indicates the tightness of the screws.

4 Claims, 2 Drawing Figures

HOLDER FOR AN ELONGATE TOOL SHANK

BACKGROUND OF THE INVENTION

The present invention relates to a holder for fixing a machine tool to a machine spindle, particularly holder apparatus used to fasten tightly a shank of the machine tool. In a case where a machine tool is fastened to a machine spindle, a machine tool holder is generally used as a joint device which is fixed in an axial bore of the spindle, and a straight shank of the tool or an adapter having a straight shank is inserted and tightened into a bore of the holder by threaded pins which are screwed and tightened into threaded holes provided through the wall of the holder. In the conventional fastening uniformly tightened engagement of the machine tool cannot be expected, since force for clamping the pins differs respectively with each operator. Namely, the force for clamping the pin is generally decided in accordance with respective skill of the operators on all such occasions, and there is subtle difference on strength of such force on each operator.

Also, in the conventional apparatus the fastened pin tends to loosen by vibration and or resistance of rotating or drilling operation during driving the machine tool and it would often cause some accident on the surface of the products which would be often damaged to produce an unfavorable irregular or roughened surface by the edge of the blade of the loosened tool.

SUMMARY OF THE INVENTION

The holder of the present invention comprises substantially a deformable thin ring which is set around a cylindrical surface of the base of the holder so as to keep an infinitesimally small clearance between the interior surface of the ring and the exterior surface of the base of the holder. A straight shank or an adapter for the machine tool can be tightly engaged in a bore in the base of the holder. Also, a pair of threaded pins for tightly fastening of the straight shank or the like of the machine tool are screwed into corresponding threaded holes provided through the wall of the foregoing base by on opposite sides of the ring at a right angle or at an optional inclined angle to the axis of the holder.

Stresses induced in the base member by tightening the threaded pins screwed into the holes of the foregoing base at a right angle or at $\theta$ degrees of an optional inclined angle produce deformations of the base, and the thin ring is influenced and is also deformed by the deformation of the base of the holder. The deformation occurs in accordance with the deformable character of the materials of the base and ring by the stresses produced by the tight fastening of the pins. The ring deforms from a rotatable to a non-rotatable condition and can thus be used as a criterion for judgement of the condition of fastening the machine tool to the holder.

Accordingly, an object of the present invention is to provide a new and improved holder apparatus which shows the condition of fastened or loosened engagement of a machine tool.

Another object of the present invention is to provide a new and improved holder apparatus which is able to indicate the tightness of engagement of the machine tool.

A further object of the present invention is to provide a new and improved holder apparatus which is able to be detect a loosened condition of engagement caused by the resistance or vibration of rotating and or drilling operation during operating the machine.

Other objects and many of the attendant advantages of this invention will be readily appreciated as the same become better understood by reference to the following description.

BRIEF DESCRIPTION OF THE DRAWINGS

The accompanying drawings illustrate the preferred embodiment of the present invention. In the drawings, the same reference numerals illustrate the same parts of the invention, in which.

DETAILED DESCRIPTION OF THE INVENTION

Figure 1:
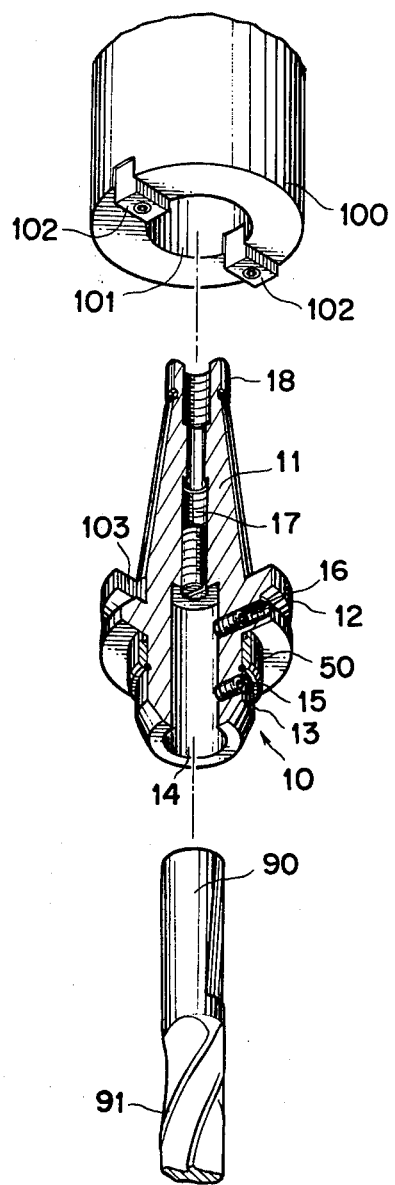
FIG. 1 is an exploded perspective view indicating the relationship of parts of a holder, a spindle and shank of a machine tool, where the holder is shown in cross-section.

Atttention is turned to the detailed description of the present invention as illustrated in the accompanying drawings wherein there is shown a preferred embodiment of the invention.

The holder apparatus 10 of the present invention comprises a shank 11 at one end, a central flange 12 and a base 13. The shank 11 has a truncated conical shape for insertion into a truncated conical hole 101 of a machine spindle 100, and fastening therein by means of a pair of keys 102 which are respectively engaged with corresponding recesses 103 on the flange 12 of the holder 10. The tip of the shank is cylindrically shaped. The annular flange 12 has an annular recess formed in the outer surface.

A large diametral axial bore 14 for receiving shank 90 or adapter of a machine tool 91 is formed from the end section of the base 13. A small diameter threaded central hole 17 is formed from the interior end of the hole 14 to the opposite end, namely to the top 18 of the shank. The through hole 17 has a larger diameter at the tip portion than the remainder of the hole.

Figure 2:
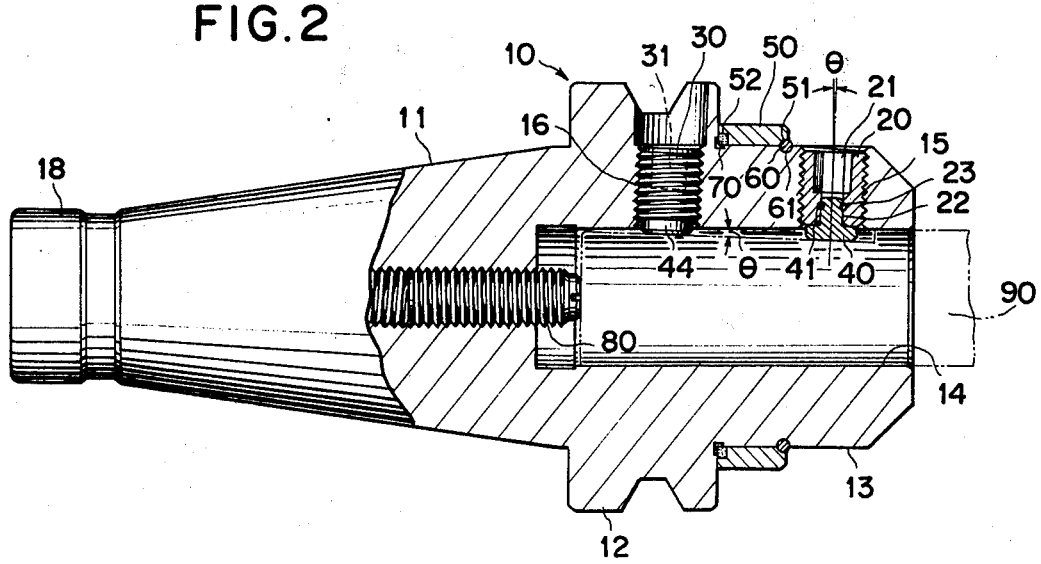
FIG. 2 is a side view of the holder in partial cross-section.

A threaded hole 15 is radially bored at a suitable portion of the base to open to the longitudinal bore 14, and another threaded hole 16 is radially bored in the same manner from the flange recess to the foregoing large hole 14. Both radial holes 15 and 16 are at a right angle or are inclined at a $\theta$ degree optional angle to the longitudinal axis. A deformable thin ring 50 is movably engaged with a cylindrical portion of the base 13 between the side face of the flange 12 and the threaded hole 15 upon an annular ring 60 and a felt ring 70 as shown in FIG. 2.

For engagement of the annular "O" ring 60, a corresponding annular groove 61 is provided around the surface of the base 13. On the interior surface of the thin ring 50, an annular groove 51 corresponding with the form of the "O" ring 60 is formed, and another annual groove 52 for engagement with the felt ring 70 is formed.

The foregoing threaded holes 15 and 16 receive threaded pins 20 and 30, the tip of the threaded pin 20 provides a small hole 22, and a small annular groove 23 is formed at a suitable portion of the interior surface of the small hole 22. A small "O" ring 41 is fitted into the small annular groove 23. By the same manner, the pin 30 has a small hole (not shown) at the tip, and a small annular groove (not shown) is formed at a suitable portion of the interior surface of the hole. A small "O" ring (not shown) is also fitted into the annular groove. A washer 40 which is shaped as a flat head rivet is engaged with the foregoing small hole 22. In the same manner, another washer 44 which is shaped as the flat head rivet is engaged with the foregoing small hole (not shown).

The top of the pins 20 and 30 have polygonally shaped holes 21 and 31 for engagement with a tip of a driver.

Prior to engagement of the foregoing thin ring 50 with the base 13, a felt ring 70 is fitted to the side face of the flange and the base 13, and the foregoing "O" ring 60 is inserted into the annular groove 61. Then the thin ring 50 is rotatably engaged upon the surface of the base 13 and the felt ring 70 is fitted into the annular groove 52 of the interior surface of the thin ring 50 and also the "O" ring 60 is fitted into the annular groove 52 of the same interior surface of the thin ring 50. The felt ring 70 is provided so as to prevent any kind of dust from insertion into the aperture between the thin ring and the base.

A clearance of about 1/100 mm to 2100 mm in one embodiment of the present invention is provided between the interior surface of the thin ring 50 and the exterior surface of the base 13. With this clearance, the ring is free to rotate on the base 13 when the pins 20 and 30 are loosened but when the pins are tightened against the tool shank 90 stresses are induced which deform the base 13 and the ring 50 so that the latter can no longer rotate.

In the drawings both threaded holes 15 and 16 are shown inclined $\theta$ degrees to the horizontal line in the holder 10, which angle, in one embodiment of the present invention, is about 2 degrees.

To correspond with this angle of inclination of the holes 20 and 30, an engagement face on the shank or adapter 90 of the machine tool 91 is inclined at the same angle of $\theta$ degrees to the axis of the hole 14. The threaded holes 15 and 16 can make a right angle against the axis, and in this case, the flat face of the shank 90 does not have the above inclination against the axis, or the flat face can be provided with a notch parallel to the axis or can be also have recesses in order to receive the flat rivet washers 40 and 44.

In the case where the shank 90 or adapter is engaged into the hole 14 of the holder 10, prior to insertion of the shank 90, the control threaded pin 80 which is screwed into the threaded hole 17 is controllingly rotated so as to project a suitable length into the hole, and then the shank 90 is inserted into the hole 14 and the threaded pins 20 and 30 are screwed by a driver having a corresponding polygonal tip. The flat head of the washers 40 and 44 of the screwed pins are touched and pressed with the flat face of the shank 90. The shank 90 is tightly fastened to the holder 10 by this means, resulting in stresses being established in the holder. In accordance with the induced stresses, the holder 10 is deformed and this deformation of the holder 10 influences the thin ring which is also deformed causing difficulty and or impossibility of movement or rotation of the thin ring itself.

The deformation of the thin ring leading to difficulty and or impossibility of rotation of the ring around the base 13 indicates the required tightness in the fastened force of the shank 90 to the holder 10 by the threaded pins 20 and 30. By contrast, when the thin ring can be rotated around the base 13, it means that the engagement force of the shank 90 to the holder 10 is weak, and the shank of the machine tool is not tightly fastened to the holder.

The detection of looseness of the thin ring shall call special attention of the operator before occurrence of trouble on the surface of the products, which special attention means to refasten the threaded pins 20 and 30.

The invention may be embodied in other specific forms without departing from its spirit or essential characteristics. The described embodiment is to the considered in all respect only as illustrative and not restrictive and the scope of the invention is, therefore, indicated by the appendant claims rather than by the foregoing description. Consequently, it is recognized many variations may be made without departing from the scope or spirit of the present invention.

What is claimed is:

1. A tool holder comprising a body having a shank portion and a base portion with a cylindrical outer surface, a longitudinal bore in said body for receiving a tool shank, fastening means in said body intersecting said bore for tightening against the tool shank and a ring surrounding said outer surface portion, said ring and said base member, under stresses caused by tightening said fastening means against the tool shank, being mutually deformable between a condition in which said ring is rotatable on said cylindrical surface and a condition in which said ring is non-rotatable on said cylindrical surface.

2. The holder of claim 1 including a flange between said shank portion and said base portion and wherein said fastening means comprises a first transverse screw means in said flange and a second transverse screw means in said base portion, said ring being located between said first and second screw means.

3. The holder of claim 2 wherein said first and second screw means have axes inclined to the longitudinal axis of said bore.

4. The holder of claim 1 including a felt washer and an O-ring between said ring and said cylindrical surface.

* * * * *